Aug. 4, 1959
K. R. CARNEY
2,897,694
UMBRELLA CLAMP
Filed Oct. 21, 1957
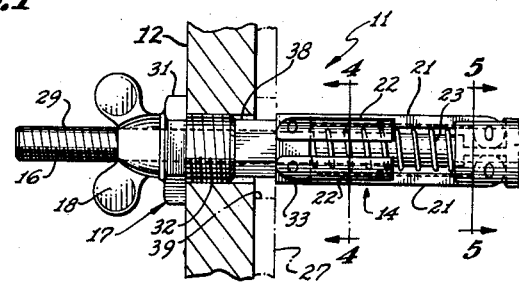
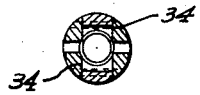
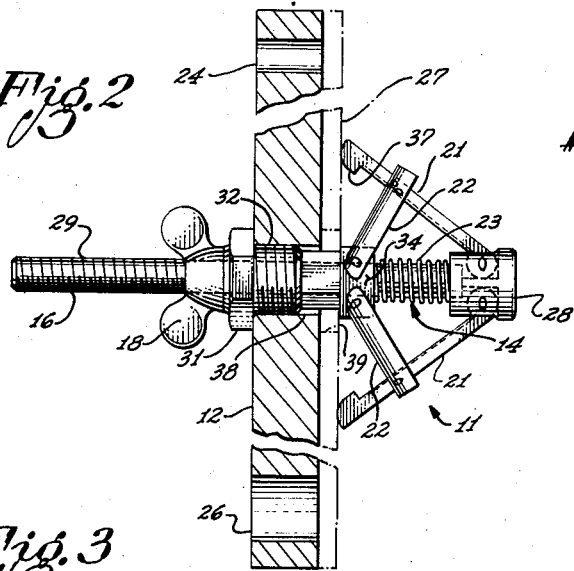
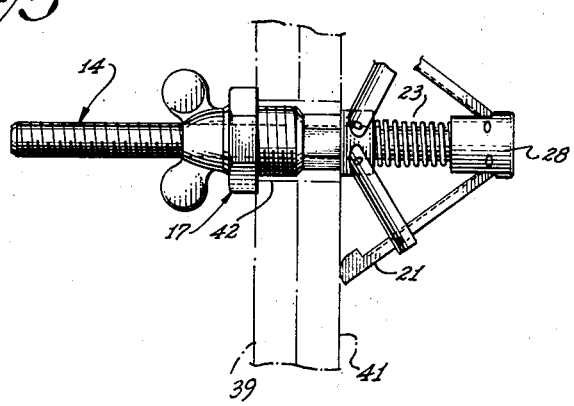
INVENTOR:
Kenneth R. Carney
His Patent Attorney United States Patent Office 2,897,694
Patented Aug. 4, 1959

2,897,694

UMBRELLA CLAMP

Kenneth R. Carney, Lakewood, Calif., assignor to Northrop Aircraft, Inc., Hawthorne, Calif., a corporation of California Application October 21, 1957, Serial No. 691,377

3 Claims. (Cl. 77—62)

This invention relates to jig-type tools and more particularly to a jig-type tool which includes a master plate or template and an expanding bolt-like component, the latter providing means whereby the master plate may be temporarily secured to various production components and thereby facilitate various operations which are to be performed on the aforementioned components.

In practice it is quite frequently advantageous and expedient to use a master plate or template to locate and duplicate machine operations such as for example, the forming of apertures and the like, in a production plate or component. A master plate or template utilized in this manner is generally secured to the production plate by temporary fastening means which can be released and therefore allows the master plate to be removed from the production plate or component after it has served its intended purpose. The bolt-like means comprising a component of the jig-type tool as disclosed herein, not only may be incorporated in a master plate or the like to provide a tool of unitary construction, but it may also be used per se to temporarily secure one plate or component to another in fixed engagement in a manner that will become apparent as the disclosure progresses.

It is an object of the present invention to provide a jig-type tool which may be easily and positively applied to and removed from various production components.

Another object is to provide a jig-type tool including a master plate or template and an expanding bolt-like component so joined to provide a tool of unitary construction.

Another object is to provide a jig-type tool including an expanding bolt-like component and in which the latter may be used per se to secure one component of an assembly to another in fixed engagement.

Another object is to provide a jig-type tool which is simple in design yet rugged in construction, economical to manufacture, and which may be easily adapted to various applications.

Although the characteristic features of the present invention are particularly pointed out in the appended claims, the invention itself, also the manner in which it may be carried out, will be better understood by referring to the following description taken in connection with the accompanying drawings forming a part of this application and in which:

Figures 1 and 2 are sectional views of the jig-type tool as disclosed herein in its contracted and expanded attitudes, respectively.

Figure 3 is a side elevational view of the clamp member as shown in Figures 1 and 2 and in which it is being utilized per se to secure a pair of plates together in engaging relation.

Figures 4 and 5 are sectional views of the tool as shown in Figures 1 and 2 as viewed along the lines 4—4 and 5—5 of Figure 1.

Referring now to the drawing and especially Figures 1 and 2, the jig-type tool as disclosed herein is identified in its entirety by the numeral 11 and consists of a base or master plate 12 and a clamp member 14. The member 14 includes a bolt-like member 16, a sleeve member 17, a wing nut 18, a pair of support arms 21—21, two pairs of intermediate or tie members 22 and a helical wound spring 23.

For illustrative purposes it is considered that the tool 11 is to be used to facilitate the location and duplication of a plurality of apertures or the like, such as the apertures 24, 26, etc. shown in Figure 2, in a production plate 27, the latter being shown in phantom construction in Figures 1 and 2. Inasmuch as the plate 12 serves as a master plate or template is constructed of high quality steel, the apertures 24 and 26 are located with the necessary accuracy and the construction of the plate 12 is otherwise of good quality.

As previously stated the clamp member 14 includes the bolt-like member 16 provided with an enlarged head portion 28 and a shank portion 29 the outer end of which is threaded. Mounted on the shank portion 29, in slidable relation therewith, is the sleeve member 17 having a hexagon shaped head 31, an externally threaded center portion 32 and an inner end portion 33 of reduced diameter. The inner end portion 33 defines two parallel side faces 34—34, as best seen in Figure 4, and to which one end of each of the tie members 22 is pivotally attached. The member 17 is maintained on the shank portion of the bolt-like member 16 by means of the wing nut 18 which threadably engages the shank 29.

The head portion of the bolt-like member 16 is of cylindrical configuration and is provided with a pair of diametrically positioned slots 36—36, as best seen in Figure 5, and which extend in a lengthwise direction with respect to the bolt member 16.

The head ends of the support arms 21 are respectively pivotally mounted in the slots 36 by means of pins or the like. The other ends of the arms 21 are provided with feet 37 which are adapted to contact the production plate 27 as presently explained. As indicated above respective ends of the tie members 22 are pivotally attached by pin means to the side faces 34 while their other ends are pivotally attached to the arms 21 at approximately the midpoint thereof also by pin means as best seen in Figures 1 and 4.

It will now be apparent that as the bolt member 16 is longitudinally moved with respect to the sleeve member 17 the arms 21 and tie members 22 will be actuated between contracted and extended positions as shown in Figures 1 and 2, respectively, and which are hereafter referred to as the contracted or folded and expanded attitude of the clamp 14. This movement is quite similar to the movement of the stays of an umbrella as the latter is moved between its closed and open positions. It will be noted by referring to Figures 4 and 5 that the outer portions of the arms 21 and members 22 are of arcuate configuration having the same radius as the cylindrical head 28 and therefore the arms 21 and members 22 assume a cylindrical configuration at such time as the clamp member 14 is in its contracted or folded attitude. In this respect it will also be seen that the inner portion of the feet 37 are also of arcuate configuration so that they may embrace the shank 16 of the bolt member at such times as the clamp 14 is in its contracted attitude as best seen in Figure 4.

Positioned between the respetcive inner ends of the sleeve member 17 and head 28 is the spring 23. The spring is selected so that it will always be compressed regardless of the position of the sleeve member 17 on the shank 16. Accordingly it will be apparent that the spring 23 will urge the sleeve member 17 in a direction toward the wing nut 18 and cause the clamp 14 to assume its contracted position assuming that the nut 18 is moved sufficiently from the head 28.

To assemble the clamp 14 on the plate 12 the clamp is first caused to assume its contracted attitude. The head portion of the bolt 16, the arms 21 and members 22 are then passed through a threaded aperture 38 formed in the plate 12. The sleeve 17 is then screwed into the aperture 38 until the inner face of the head 31 is in firm contacting relation with the outer face of the plate 12. It will now be seen that the tool 11 is rendered unitary or of one piece construction.

The plate 12 is now positioned on the production plate 27 in juxtaposed relation with the head 28, arms 21 and members 22 passing through an aperture 39 previously formed in the plate 27. The sleeve 17 is of a suitable length, depending upon the thickness of the plates 12 and 27, to position the ends of the members 22 which are pivotally attached thereto slightly inside or to the right of the unexposed or inner side of the plate 27.

The nut 18 is now rotated so that the head 28 is urged in the direction of the nut and the latter action causes the arms 21 and member 22 to spread to the position shown in Figure 2. Continued rotation of the nut 18 results in additional spreading of the arms 22 and the movement of their feet 37 toward the plate 27. Upon further and sufficient rotation of the nut 18 the feet 37 come in contact with the surface of the plate 27. Due to the bracing effect of the members 21 the feet 37 are caused to exert a considerable frictional force on the surface of plate 27 and preclude further movement of the feet relative to the plate 27. Further rotation of the nut 18 now results in the feet 37 firmly contacting the plate 27 and the plates 12 and 27 being secured together in firm and fixed contact. It will now be apparent that the apertures 24 and 26 may be duplicated in the plate 27 in a conventional manner.

It will also be seen that the clamp 14 may be utilized per se to secure a pair of plates or components in engaging relation as shown in Figure 3. In this figure the clamp 14 is utilized to secure a pair of plates 39 and 41 together in fixed engaging relation. In this case it will be noted that the diameter of the aperture 42 formed in the plate 39 exceeds the diameter of the threaded portion of the sleeve 17. It will therefore be seen that the clamp 14 and outer plate 39 are not permanently secured together as is the case in Figures 1 and 2. Otherwise the operation of the clamp is the same as previously described and further explanation in this respect is not deemed necessary.

Accordingly it will be seen that a jig-type tool having the many advantages and fulfilling the objects of the invention has been disclosed. The clamp 14 and plate 12, being permanently secured together as shown in Figures 1 and 2, provide a unitary tool. Thus, in addition to other advantages, an operator using the present tool is not confronted with the difficulty of handling more than one part and the possibility of losing, dropping or misplacing one or more components of tools which are not of unitary construction.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A jig-type tool comprising: a plate having a threaded aperture formed therein and a clamp member secured in said aperture; said clamp member including an elongated bolt-like member having a head portion and a partially threaded shank; a sleeve slideably mounted on said shank and which has an outer threaded portion; a pair of elongated arms having head and foot ends; said head ends being pivotally attached to the head portion of said bolt-like member; a plurality of tie members each of which has one end pivotally attached to said sleeve and the other end pivotally attached to a respective one of said arms at approximately the midpoint thereof; a spring mounted on said bolt-like member between said head and the adjacent end of said sleeve continuously urging said bolt-like member in a direction to effectively increase the distance between said head and sleeve; said clamp member being mounted in said aperture with the threaded portion of said sleeve engaging the threads in said aperture and with said arms and tie members positioned entirely on one side of said plate and said threaded shank extends from the other side of said plate; and nut means mounted on said threaded shank for urging said bolt-like member in a direction to decrease the distance between said head and the adjacent end of said sleeve when rotated in one direction.

2. A jig-type tool as set forth in claim 1: further characterized in that said bolt-like member has a longitudinal axis extending in a direction normal to the side surfaces of said plate and said clamp is symmetrically constructed with respect to the longitudinal axis of said bolt-like member.

3. In a jig-type tool the combination comprising: an elongated bolt-like member having a head and a partially threaded shank; a sleeve having a central aperture exceeding the diameter of the shank of said bolt-like member and an outer threaded portion; said bolt-like member being mounted in the central aperture in said sleeve with the head and threaded shank of said bolt-like member extending from the respective ends of said sleeve; a pair of elongated arms having head and foot ends; said head ends being pivotally attached to the head of said bolt-like member; a plurality of tie members each of which has one end pivotally attached to said sleeve and the other end pivotally attached to a respective one of said arms at approximately the midpoint thereof; a spring mounted on said bolt-like member between said head and the adjacent end of said sleeve continuously urging said bolt-like member in a direction to effectively increase the distance between said head and sleeve; and nut means mounted on said threaded shank for urging said bolt-like member in a direction to decrease the distance between said head and the adjacent end of said sleeve when rotated in one direction.

References Cited in the file of this patent

UNITED STATES PATENTS

| | | |
|---|---|---|
| 1,244,112 | Mackle | Oct. 23, 1917 |
| 2,257,318 | Wilborn | Sept. 30, 1941 |

FOREIGN PATENTS

| | | |
|---|---|---|
| 3,841 | Great Britain | 1897 |
| 23,207 | Great Britain | 1906 |